Patented Sept. 6, 1949

2,481,188

UNITED STATES PATENT OFFICE 2,481,188

CHLORINATION OF POLYETHYLENE

Vigen K. Babayan, Teaneck, N. J., assignor, by mesne assignments, to Pierce Laboratory, Inc., New York, N. Y., a corporation of New York No Drawing. Application March 30, 1946, Serial No. 658,480

2 Claims. (Cl. 260—94.9)

This invention relates to the chlorination of polyethylene. The present application is a continuation-in-part of my copending application Serial No. 577,933, filed February 14, 1945, now abandoned.

Certain chlorinated polyethylene products and certain technique for chlorinating polyethylene are already known, as disclosed for example in Fawcett Patent No. 2,183,556 of December 19, 1939. Stated very generally, the present invention contemplates improvements over the art both with respect to technique for chlorinating polyethylene and also with respect to chlorinated polyethylene products.

Briefly, according to certain prior practice, as exemplified by the Fawcett patent mentioned above, chlorination of polyethylene was effected by forming a dispersion of the polyethylene in carbon tetrachloride and bubbling chlorine gas through the dispersion. According to the prior patent, by proceeding in this way the bulk of the product separates from the solvent and is removed by filtration, after which it may be washed with water to remove chlorine and hydrogen chloride and then, if desired, further purified by reprecipitation from hot carbon tetrachloride. The prior patent still further contemplated fractionation of the product, for instance by fractional solvent extraction or precipitation, to secure fractions of graded properties varying, for instance, in chlorine content.

I have found that the foregoing prior technique yields a product having a relatively limited chlorine content, even when the chlorination is prolonged for many hours, for instance, for as long as 100 hours.

I have further found that some unusual and unexpected changes in properties of the product occur as the chlorine content is progressively increased. For example, with polyethylene of relatively high molecular weight (for example from 15,000 to 20,000), as the chlorine content rises to about 30% combined chlorine, the solubility of the chlorinated polyethylene progressively increases, and with further increase in content of chlorine up to a percentage in the neighborhood of the middle 50's the solubility progressively decreases, reaching a very low value, lower than the solubility of the original unchlorinated polyethylene when the chlorine content approaches a percentage in the middle 50's. Similar phenomena with respect to polyethylene of lower molecular weight apparently were also observed by the patentee Fawcett, the point of minimum solubility corresponding to the point which the patentee refers to as the time when the bulk of his product separates or precipitates from the chlorination solvent.

I have further discovered that by adopting certain chlorination technique, very much higher chlorine content can be attained, and that by raising the content of combined chlorine well above the value corresponding to minimum solubility, a surprising effect occurs with respect to the solubility properties of the chlorinated polyethylene product, and also with respect to the softening and decomposition temperatures of the product. The very high chlorine content products made according to the present invention manifest greatly increased solubilty properties not only as compared with the original unchlorinated polyethylene, but also as compared with the moderately increased solubility properties which appear at a mean chlorine content in the neighborhood of 30%. This is true both with respect to range of solvents and also with respect to the percentage concentration of the chlorinated product which may be placed in solution in a selected solvent. Moreover, the very high chlorine content products of the present invention have strikingly elevated softening and decomposition temperatures, as compared with the same unchlorinated polymer and even as compared with a chlorinated product having a chlorine content only 5–10% lower than that contemplated by this invention.

Beyond the foregoing I have still further discovered that by employing certain chlorination technique the time required for chlorinating polyethylene, especially to the relatively high chlorine content contemplated, is enormously reduced, it being possible according to the present invention to attain a chlorine content well above 70% in as little time as one-half hour to two hours, this being only a small fraction of the time required according to the process of the Fawcett patent in achieving a chlorine content of about 40 to 50%.

A typical chlorination is effected according to the present invention in the following manner:

A dispersion of the polyethylene in carbon tetrachloride is first prepared. The concentration of this dispersion is an important factor in the process of the invention and should be quite low. The exact concentration permissible may vary somewhat depending upon the molecular weight of the particular polyethylene being chlorinated. In a typical case, with a polymer ranging from about 18,000 to 20,000 molecular weight, the concentration of the polymer in the dispersion should be less than 5%, preferably less than 3%. The dispersion is advantageously prepared by heating the carbon tetrachloride to a temperature close to its boiling point, say 70° C., so as to dissolve as much as possible of the polyethylene in the carbon tetrachloride.

After preparation of the dispersion, chlorine gas is bubbled through, it being of advantage to so introduce the gas as to cause agitation and circulation of the dispersion during the chlorination. Mechanical agitation may also be employed. During the bubbling of the chlorine gas, the dispersion is subjected to the action of catalytic light, this being of especial importance during rise in chlorine content through the percentage range (the middle 50's) corresponding to the range of minimum solubility of the chlorinated polymer and through the percentage range extending upwardly from the value corresponding to minimum solubility. Because of the importance of exposure of the dispersion to catalytic light the chlorination is advantageously effected in a glass reaction vessel and the light may then be supplied by positioning strong incandescent electric light bulbs close to the vessel.

The low concentration, the vigorous agitation and also the catalytic light are all of importance in avoiding agglomeration and separation of the chlorinated material during that portion of the treatment where the chlorine content is rising through the region of minimum solubility of the product. Where the percentage of chlorine is driven up considerably beyond the region of minimum solubility, the chlorinated product forms a clear solution in the carbon tetrachloride.

The rate and effectiveness of chlorination is also enhanced by maintaining the temperature of the dispersion during chlorination at a point close to the boiling temperature of the carbon tetrachloride or other solvent used. This elevated temperature is of especial importance in attaining the very high chlorine content contemplated according to the present invention, i. e., a content in the neighborhood of 73%. It is of advantage to employ equipment providing effective reflux during chlorination, so as to prevent excessive loss of solvent, although, if desired, additional solvent can be added from time to time in order to maintain the dispersion at a relatively low viscosity. Since the chlorination, particularly in the presence of catalytic light of high intensity, is an exothermic reaction, the temperature will tend to rise and may, if desired, be controlled by the reflux or, if desired, by other means.

The chlorination to a high content, well over 70%, may be effected even at room temperature, although in this case somewhat greater time and greater excess of chlorine will be required.

After the chlorination is completed the dispersion is mixed and agitated either with an alcohol such as methyl alcohol or with water at or close to its boiling point. In either case the chlorinated polyethylene separates and may then be dried or washed and dried. In a typical case the product has a chlorine content of 73%.

Thus, according to the invention, a product having an exceptionally high chlorine content is directly secured, without resorting to fractionation of a product of substantially lower mean chlorine content.

Where alcohol is employed for separation of the chlorinated product, the product comes out as a flaky or powdery precipitate from which the mixture of carbon tetrachloride and alcohol may readily be decanted. When employing hot or boiling water separation occurs by accumulation of the chlorinated material on the surface of the water in the form of a porous and fibrous white mass. In both cases, the product is substantially freed of solvent, hydrogen chloride and free chlorine.

In considering the foregoing procedure it is pointed out that the process of the invention may be applied to polyethylene of molecular weight ranging upwards of about 3000 or 4000, although, for reasons which will further appear, the process of the invention is of especial importance in the chlorination of polyethylene of relatively high molecular weight, say from 15,000 to 40,000 or higher, for instance, 18,000 to 20,000. The relatively low molecular weight polymers are distinguished from those of higher molecular weight in a number of characteristics. For example, the low molecular weight polymers, say from 3000 or 4000 up to about 10,000, before chlorination, are of waxy consistency and somewhat higher solubility. In contrast, polymers of molecular weight upwards of about 15,000 have a horn-like consistency before chlorination and have relatively low solubility characteristics. In highly chlorinated form these higher molecular weight polymers constitute quite tough solids capable of yielding films or filaments of exceptional tensile strength, toughness, flexibility and elasticity, as compared with chlorinated polyethylene of low molecular weight. Because of the extensive decrease in solubility in the percentage range centered on about the middle 50's, with polyethylene of the higher molecular weights, chlorination to the relatively high chlorine content contemplated by the invention is especially difficult. During the rise of chlorine content through the range of minimum solubility, the polyethylene of relatively high molecular weight tends to form jelly-like masses and, in view of this, the relatively low concentration of the polyethylene in the dispersion and also vigorous agitation (either by virtue of the manner of introduction of the chlorine gas or by mechanical means) are both of importance in order to ensure that any such masses which tend to form are effectively broken up.

A number of variables may be introduced into the process, as follows:

First, with respect to the solvent or dispersion medium to be employed during chlorination, in general, the solvent should have appreciable solubility for the polyethylene and should preferably have relatively low viscosity. For most purposes, it is desirable to employ a dispersion medium which is inert to the action of chlorine gas, chlorinated solvents such as carbon tetrachloride, dichloroethane and chloroform being suitable. Even certain solvents, (for example, trichloroethylene, trichloroethane and perchloroethylene, etc.), which are not inert to chlorine may be used, although in this event an excess of chlorine would be required since some of the chlorine reacts with the solvent.

The percentage of polyethylene to be dispersed or dissolved in the solvent will depend somewhat on the molecular weight of the polyethylene being chlorinated. With polyethylene of molecular weight of the general order of fifteen thousand to twenty or twenty-five thousand the percentage dispersed in the solvent should be less than 5% and preferably below 3%, and with polyethylene of still higher molecular weight somewhat lower percentages may be preferred. In the case of polyethylene of molecular weight appreciably below 15,000, somewhat more may be dispersed in the solvent, for instance, up to about 10% where the molecular weight is in the neighborhood of a few thousand. The percentage which is practicable to handle will vary somewhat depending upon the solubility of the polyethylene in the particular solvent used, upon the type of equipment being employed and the effectiveness of the agitation (mechanical or otherwise), particularly at the intermediate stage of chlorination where turbidity and precipitation tend to occur.

Another important factor to consider in connection with the concentration of polyethylene in the chlorination solvent is that during the last phase of the chlorination, for instance during rise in chlorine content of the product above about 60%, the concentration of the chlorinated product should not be greater than that corresponding to the limit of solubility of the chlorinated polyethylene in the particular solvent being used and at the temperature at which the last phase of chlorination is being effected.

Observing this guide with respect to concentration of the chlorinated product in the solvent is of importance in order to ensure that at the end of the chlorination the product is in solution in the chlorination solvent, from which solution the product may readily be precipitated. Since the solubility of the chlorinated product increases with increase in chlorine content above about 60%, reaching a relatively high value at a content of about 73% (which represents the preferred product of the invention), the permissible maximum concentration of the chlorinated product in the solvent at the end of the chlorination, will vary directly with the content of chlorine to which the polyethylene is being chlorinated. The permissible maximum will also vary with polyethylene of different molecular weight.

To illustrate the above, with high molecular weight polyethylene (for instance, of the order of 15,000 to 20,000 or 25,000) at a content of chlorine between about 60% and 65%, a maximum of about 5 to 10% of the chlorinated polyethylene will remain in solution in the chlorination solvent (e. g. carbontetrachloride) at the end of the chlorination, and at a temperature above 60° C. which is desirably maintained during the chlorination. With this high molecular weight polyethylene at a chlorine content in the neighborhood of 73% (as is preferred), a maximum of about 25% of the chlorinated polyethylene will remain in solution in the chlorination solvent at a temperature above 60° C. With the lower molecular weight products the permissible maximum concentration will be somewhat higher. For example, with a product made by chlorinating polyethylene of about 4000 molecular weight and containing in the neighborhood of 73% chlorine, a concentration as high as 60% is permissible at the end of the chlorination. It is pointed out that at lower temperatures, for instance at about room temperature the permissible maximum concentration at the end of the chlorination will be somewhat lower.

With the foregoing in mind, it will be seen that proper selection of the initial concentration of the polyethylene in the chlorination solvent is of importance not only in avoiding precipitation of the product during rise of chlorine content through the range of minimum solubility, but also in ensuring that at the end of the chlorination the chlorinated product will be in solution in the chlorination solvent and, therefore, can be precipitated, for instance by admixture with alcohol or boiling water, in accordance with the preferred technique for separation of the product from the chlorination solvent. In the event of excessive loss of solvent during chlorination, solvent may be added toward or at the end of the chlorination in order to ensure that the permissible maximum concentration is not exceeded and that the product will be in solution. Similarly, addition of solvent may be resorted to in a case where the initial concentration is relatively high and vigorous agitation is relied upon to ensure chlorination through the range of chlorine content corresponding to minimum solubility.

Instead of employing incandescent electric light bulbs as a source of catalytic light, fluorescent, mercury arc or even sunlight may be used, the important point being that a reasonable intensity of the catalytic light is desirable through the depth of the batch or column of material being chlorinated.

With respect to the time of chlorination and the rate of introduction of chlorine gas, as noted above it is possible according to the invention to attain an exceptionally high content of chlorine in a very short time. Under chlorination conditions approximating the preferred conditions as given herein, a very high chlorine content can be attained in a matter of a few hours, and under the most favorable conditions may even be attained in as little as one-half hour. The time will, of course, depend on various factors such as the intensity of the catalytic light, the character of the equipment, the temperature and, naturally, the rate of introduction of the chlorine.

In calculating the total quantity of chlorine to be used and the rate of introduction, it should be kept in mind that the chlorination of the polyethylene molecule constitutes a substitution reaction, i. e., a reaction in which hydrogen atoms are replaced by chlorine atoms in the molecule. The quantity of chlorine used should be at least double that to be combined in a product of any given chlorine content, since half the chlorine used forms hydrogen chloride with the individual hydrogen atoms replaced, the hydrogen chloride being evolved in gaseous form. Some excess chlorine may desirably be introduced, depending upon the nature of the equipment in which the reaction is effected, but ordinarily this excess need not be more than about 25% excess. In the case of production of a product containing in the neighborhood of 73% combined chlorine, as is preferred, if chlorination is to be effected within about two hours, the rate of introduction of the chlorine should be about 300% by weight of the polyethylene per hour.

In employing the alcohol precipitation technique, instead of using methyl alcohol, other alcohols may be employed, such as ethyl alcohol and isopropyl alcohol. Still further, other liquid precipitants may be used such as mineral spirits and other aliphatic hydrocarbons or any liquid in which the chlorinated product is substantially insoluble but in which the solvent selected for use during chlorination is relatively easily soluble, for instance acetone.

It may be mentioned that in the case of separation of the chlorinated product by agitation with boiling water, the carbon tetrachloride or other solvent employed is volatilized.

Still another method of separation is to spray the solution into a warm chamber, thereby volatilizing the solvent, and yielding the product in the form of small particles or flakes.

With further reference to separation of solvent, especial attention is called to another important aspect of the invention, i. e., the production of fine and tough filaments, which are usable in forming threads and/or fabrics. According to the invention this may be accomplished in a novel manner by chlorinating the polyethylene to the desired extent and then delivering the chlorinated polyethylene-solvent solution through a spinning nozzle of the spinnerette type having a multiplicity of fine holes, and continuously drawing the filaments from the spinnerette to form a thread. This may be done with the spinnerette below the surface of a spinning bath containing a precipitating liquid such as those mentioned above, or may even be done by spinning the filaments in warm air. When spinning filaments the concentration of the solution should be relatively high, preferably close to the point of maximum tolerance of the solvent for the chlorinated polyethylene. If the concentration is relatively low at the end of the chlorination it is of advantage first to volatilize a portion of the solvent used during chlorination so as to increase the viscosity and the concentration of the solution to an appropriate consistency for spinning. Since the solubility of the preferred product of the invention (containing in the neighborhood of 73% chlorine) is quite high, it is particularly advantageous to use the preferred product when spinning. If desired, a plasticizer may be added to the polyethylene-solvent solution before spinning.

The product of the invention can also be separated from the solvent in which it is chlorinated in the form of films as by spreading the solution in the form of sheets, either with or without preliminary concentration of the solution. In fact, it is even possible to volatilize off all or substantially all of the solvent even from masses of the material by employing pressure and elevated temperatures, thereby yielding bulk material which may be molded or sheeted in any desired form.

In general it is of distinct advantage, from the standpoint of securing a substantially pure product, to effect separation of solvent with the product in finely divided form or in a physical form characterized by a small cross-sectional dimension.

The physical form of the product will vary depending upon the method of separation employed, the form being powdery, flaky, porous, fibrous, stringy, filament-like, sheet, or even bulk, but in all cases films or filaments made from the material manifest toughness and flexibility.

With respect to the separation of the chlorinated product from the dispersion medium employed during chlorination, it is of importance, especially where a chlorinated solvent is employed as the dispersion medium, to thoroughly remove even minor traces of solvent, as well as free chlorine and hydrogen chloride. When employing precipitation technique (for instance alcohol or water precipitation), this high degree of separation is achieved by vigorous agitation of the mixture of the liquid precipitant used and the dispersion of the chlorinated product in the chlorination solvent. In some cases it may be advantageous to subject the precipitated product to repeated washings with alcohol or water.

The substantial elimination of hydrogen chloride, free chlorine and of the dispersion medium employed during chlorination is of importance in increasing the stability of the product as against decomposition at room temperatures. In fact, when the product is substantially freed of dispersion medium, free chlorine and hydrogen chloride it constitutes a highly stable material not requiring the addition of any stabilizing agent or any special stabilizing treatment. In view of these factors, the preferred product of the invention is separated or purified to such an extent as to constitute at least 98% of the bulk of the total product; and such a product is herein considered as consisting essentially of the chlorinated polyethylene.

Chlorinated polyethylene made in accordance with this invention and having a chlorine content in the neighborhood of 73% constitutes a substantially uniform product in the sense that the bulk of the material consists essentially of similar molecules. This is believed to be established by the following:

As is known, polyethylene is produced by polymerization of ethylene, the product in general being a hydrocarbon of straight chain type. In the higher molecular weights preferred for use according to the invention, the chain is of considerable length. Calculated theoretically, if such a polymer is chlorinated to an extent yielding a product having an average of one chlorine atom substituted in each ethylene radical of the chain, the content of combined chlorine would be about 56.7%. Again, calculating theoretically, if the chlorination proceeds to the degree in which two chlorine atoms are substituted for hydrogen atoms in each ethylene radical of the chain, the content of combined chlorine would approximate 73.1%. I believe that with a chlorine content of 73.1% a chlorine atom is substituted for hydrogen on each carbon atom of the chain.

For various reasons which need not be considered in detail herein, it appears theoretically impracticable to effect chlorination to such an extent as to substitute three chlorine atoms for hydrogen atoms in each ethylene radical of the polymer, at least with the general type of chlorination herein contemplated. With this and the above theoretical calculations in mind, I believe that chlorination of polyethylene to a chlorine content lying between 56.7% and 73.1% yields a product which is not a uniform product or pure compound, but a mixture of polymer molecules, in some of which the chlorination has proceeded to the extent effecting two substitutions per ethylene radical and in some of which the chlorination has proceeded to the extent effecting an average of one substitution per ethylene radical. In such a product (having a chlorine content intermediate 56.7% and 73.1%) it may also be possible that some completely unchlorinated molecules are present. In any event, I believe products having chlorine contents between 56.7% and 73.1% are mixtures of compounds having quite different characteristics, especially with respect to solubility properties, melting point and decomposition point. To illustrate, a product which consists essentially of molecules having an average of one chlorine atom substituted in each ethylene radical is a highly insoluble material, even in chlorinated solvents, such as carbon tetrachloride. The solubility of such a product is, in fact, lower than that of the same unchlorinated polyethylene. In contrast, I have found that a product essentially consisting of molecules in which two chlorine atoms have been substituted in each ethylene radical, the solubility is enormously increased, even as compared with the same unchlorinated polyethylene. Such a product (consisting essentially of material having two substitutions per ethylene radical) has greatly increased solubility characteristics not only with respect to range of solvents but also with respect to the concentration thereof which may be dissolved in any selected solvent.

The differences between melting and decomposition points of products at about 56.7% chlorine on the one hand, and 73.15% chlorine on the other hand, also make a striking contrast. A typical unchlorinated polyethylene of molecular weight of 18,000 to 20,000 begins to soften at about 108° C. and fuses at about 112° C. This same polyethylene chlorinated to about 56.7% has a softening point considerably lower than the unchlorinated material, for instance, in the neighborhood of 50° C. In contrast, a typical product made by chlorinating the polyethylene to a content in the neighborhood of 73% combined chlorine does not begin to soften until a temperature even above 200° C. is reached. Moreover, such a typical product (containing 73% combined chlorine) does not show signs of decomposition until a temperature even substantially higher is reached, for instance, at about 230–240° C.

In view of the fact that triple substitution of chlorine atoms for hydrogen atoms in each ethylene radical of the polymer is not to be expected, and for other reasons mentioned hereinafter, the product of the present invention, containing in the neighborhood of 73% combined chlorine, constitutes a uniform product, rather than a mixture of compounds. In this connection it may be noted that products containing even as high as about 67% of combined chlorine (assuming that they are made up of two fractions in one of which there has been two substitutions per ethylene radical and in the other an average of one substitution per radical) constitute roughly a 50–50 mixture by weight of molecules containing 56.7% chlorine and molecules containing 73.1%.

It is interesting to note in connection with the softening and decomposition points of polyethylene chlorinated to different percentage contents of chlorine that a typical product made by chlorinating polyethylene of molecular weight of 18,000 to 20,000 and containing about 67% chlorine, has a softening point in the neighborhood of 120° C. and shows signs of decomposition at about 145° C., which temperatures are each almost 100° C. lower than the softening and decomposition temperatures of a typical preferred product according to the invention, containing 73% combined chlorine. These striking differences which, it will be noted, take place with only a few per cent increase in chlorine content (from 67 up to 73%), are believed to be further evidence that the 73% product of the present invention does in fact constitute a uniform material, rather than a mixture of different compounds.

That the product of the invention, containing in the neighborhood of 73% combined chlorine, does in fact constitute a uniform material is further evidenced by the fact that such a product manifests no appreciable capability of being fractionated, for instance, by fractional precipitation (assuming, of course, that the particular polymer being chlorinated does not contain constituents which might be separable by fractionation because of having widely varying molecular weights).

That chlorinated polyethylene prepared in accordance with the present invention and containing in the neighborhood of 73% combined chlorine does in fact constitute a substantially uniform material is further apparent in view of the quantity of chlorine which may be used to secure the product containing 73%. To illustrate, theoretical calculation shows that a batch of 28 grams of polyethylene requires 140 grams of chlorine to effect substitution of two chlorine atoms in each ethylene radical of the molecule and to eliminate the replaced hydrogen atoms as hydrogen chloride; whereas a batch of polyethylene of the same weight would theoretically require 210 grams of chlorine where three chlorine atoms are to be substituted in each ethylene radical of the molecule. When following the method of the present invention, a 28 gram batch of polyethylene may be chlorinated to an extent yielding a product having in the neighborhood of 73% combined chlorine by the use of as little as 150 grams of chlorine (only 10 grams or 7½% in excess of the theoretical required for two substitutions), which is far less than is theoretically required to secure three substitutions in each ethylene radical. Even if it be assumed to be practicable to secure triple substitution in some molecules, which would at the very least be extremely difficult, to accomplish such triple substitution would certainly require a considerable excess of chlorine beyond the theoretical quantity. Thus the attainment of a product containing 73% chlorine by employing only a minor excess of chlorine establishes that the product consists essentially of molecules having two substitutions per ethylene radical.

Because of various of the desirable characteristics of the product having two chlorine atoms substituted in each ethylene radical of the molecule, when preparing the preferred product of the invention it is desirable that the chlorination be carried sufficiently far to ensure that the product does consist essentially of radicals having double substitution. With this in mind, it is preferred that the chlorination be continued at least to that point where not more than about 10% of the product comprises molecules having an average of only one substitution in each ethylene radical. A product of which 90% or more consists of molecules having two substitutions (73.1% chlorine) and 10% or less of molecules with one substitution (56.7% chlorine) would have a minimum mean chlorine content of 71.46%; and such products are herein considered as consisting essentially molecules having two substitutions per ethylene radical.

In addition to being substantially pure, the preferred product of the present invention (having in the neighborhood of 73% chlorine), further has a number of other desirable characteristics, including exceptionally high softening and decomposition points. Typical products according to the invention made by chlorinating polyethylene of molecular weight of from 18,000 to 20,000, and containing about 73% combined chlorine, only begin to soften at a temperature upwards of about 175° C., which is at least 65° C. higher even than the melting point of the same unchlorinated polyethylene. The decomposition point of such typical products is above about 200° C., which is exceptional in the field of chlorinated organic materials.

The figures for softening and melting points given herein were determined by using the Hershberg melting point apparatus, the temperature rise being 5° per minute.

The softening temperature of the preferred product (containing in the neighborhood of 73% combined chlorine) will vary somewhat depending upon the molecular weight of the particular polyethylene selected for chlorination. In general, the softening point of the product will increase in molecular weight, but with products made by chlorinating polyethylene of molecular weight upwards of 15,000, as is preferred, the softening point lies above about 140° C.

Filaments or films made from the product of the present invention manifest exceptionally high toughness, elasticity, flexibility and tensile strength as compared with other types of chlorinated organic materials, and these characteristics are, to a large extent retained by the product over a broad range of temperatures including quite low temperatures, for instance, down to about −50 or −60° C.

The greatly increased solubility of the highly chlorinated polyethylene of the present invention constitutes a valuable characteristic. To illustrate the solubility, it is pointed out that a typical product containing in the neighborhood of 73% combined chlorine and made by chlorinated polyethylene of molecular weight of 18,000 to 20,000 is soluble in carbon tetrachloride at a temperature of about 70° C. up to about 25% concentration. In toluene, at 75° C., such a product is soluble up to a concentration of about 35%. The preferred product also is appreciably soluble in aromatics such as chlorbenzenes, benzene, xylene, and oxygenated solvents such as dioxane, and to some extent in esters such as butyl acetate.

The above solubilities are very high when compared with the same unchlorinated polymer and also with the same polymer chlorinated to any percentage content of chlorine appreciably below 73%. To illustrate, a solution of only about 5% concentration can be formed with unchlorinated polyethylene in carbon tetrachloride at about 70° C. Similarly, the same unchlorinated polyethylene is soluble in toluene at 80° C. only up to about 10%. Chlorinated polyethylene of comparative molecular weight (18,000 to 20,000) having a percentage content of chlorine in the middle 50's (corresponding roughly to an average of one substitution per ethylene radical), is a highly insoluble material, being capable of solution to only about 2% in carbon tetrachloride at 70° C.

If desired, still further flexibility may be imparted to the product by the addition of plasticizers such, for example, as chlorinated diphenyl.

Another important and valuable characteristic of the product is an exceptionally high dielectric strength, in view of which the product has important uses in the field of electrical insulation, for example, for condensers, cables and other electrical equipment.

The product is also of great utility in the fields of protective coatings and impregnating compounds, particularly because the product has excellent alkali and acid resistance and is fire and flame proof.

Because of the very high content of chlorine in the preferred product of the invention, even quite small quantities of the product used in fire and flame proofing compounds will contribute a high degree of fire and flame resistance. Thus, a small amount of the chlorinated polyethylene product of the present invention, added to an impregnating or coating composition, will contribute toughness and flexibility and will also increase alkali and acid resistance, as well as contributing fire and flame resistance.

Still another important characteristic of the present product is that, among chlorinated organic materials, it is unique in that an unplasticized film deposited from a solvent may quite readily be stripped intact from a smooth coated surface, such as glass, in spite of the fact that the product has good adherence to such surfaces. This is due to the unusual flexibility, elasticity and toughness of films formed from the product of this invention.

Because of various considerations fully discussed above, and particularly because of greater difficulty encountered in securing substitution of two chlorine atoms in each ethylene radical of the polymer, the method of the present invention is especially advantageous in effecting chlorination within the percentage range of chlorine content (in the product) where a substantial proportion of the product has two substitutions per radical. Thus, the method of the invention is especially adapted to the production of chlorinated products having a chlorine content upwards of about 60% combined chlorine. By the method herein disclosed chlorination to a percentage from about 60% up to the neighborhood of 73% may readily be effected even in as short a time as one-half hour, notwithstanding the fact that in attaining such a percentage of combined chlorine the product is carried through and beyond the percentage range corresponding to minimum solubility, which is a particularly difficult phase of the chlorination, especially with polyethylene of the higher molecular weights, for instance of the general order of from 15,000 to 40,000.

EXAMPLES

Various points are illustrated by groups of examples given hereinafter, some of the examples being presented primarily to illustrate variations of the method of the present invention, and certain others being given primarily to illustrate the preferred product of the invention. In all cases, chlorination was effected by preparing a solution or dispersion of the polyethylene in the dispersion medium selected as a carrier, the dispersion medium or solvent usually being warmed to a temperature close to its boiling point for the purpose of initially causing at least partial solution of the polyethylene in the carrier medium.

In all examples chlorination was effected in a glass reaction vessel by bubbling chlorine gas through the dispersion in the presence of catalytic light, for which purpose several 300-watt incandescent electric light bulbs were placed close to the exterior of the glass reaction vessel. Reflux was employed to prevent excessive loss of the chlorination solvent.

In the examples (except where otherwise indicated), the chlorination itself normally raised the temperature somewhat, but in certain examples, particularly where the concentration of polyethylene in the solvent was relatively low, some additional heat was supplied in order to maintain the temperature of the solution reasonably close to the boiling point of the solvent employed.

EXAMPLES 1–4

In each example of this group a dispersion of the polyethylene was first prepared in carbon tetrachloride, and in each case the chlorinated product was precipitated by mixing and agitating methyl alcohol with the solution of the chlorinated product.

This particular group of examples illustrates variation in concentration of the polyethylene in the carrier or solvent. The polyethylene employed in this group of examples had a molecular weight of the order of 18,000 to 20,000.

The percentage concentration of the polyethylene in the solvent, the temperature and time of chlorination, the quantity of polyethylene chlorinated and the total amount of chlorine used are given below in Table Ia. The nature of the product of each example is indicated in Table Ib.

TABLE IA

Varying concentration in $CCl_4$—with methyl alcohol precipitation

| Ex. # | Conc. of Polyethylene in $CCl_4$ (Per Cent) | Temp., (° C.) | Time (Hrs.) | Amount (gms.) | Chlorine used (gms.) |
|---|---|---|---|---|---|
| 1 | 1.0 | 75 | 5¼ | 40 | 760 |
| 2 | 1.5 | 65 | 2¾ | 84 | 575 |
| 3 | 2.5 | 74 | 5¾ | 100 | 1,600 |
| 4 | 5.0 | 75 | 2½ | 100 | 800 |

TABLE IB

Varying concentration in $CCl_4$—with methyl alcohol precipitation

| Ex. # | Conc. of Polyethylene in $CCl_4$ (Per Cent) | Character of Product | Chlorine Content (Per Cent) |
|---|---|---|---|
| 1 | 1.0 | Flaky, white | 75.8 |
| 2 | 1.5 | do | 76.2 |
| 3 | 2.5 | do | 74.9 |
| 4 | 5.0 | Fibrous, white | 66.5 |

EXAMPLES 5–7

This group of examples also illustrates another variation in method, i. e., variation in the solvent or dispersion medium employed as a carrier for the polyethylene during chlorination. Here also the polyethylene had a molecular weight of the order of 18,000 to 20,000.

In all examples of this group the concentration of the polyethylene in the carrier medium or solvent was 1.5%, and in each case the chlorinated product was precipitated from methyl alcohol.

Table IIa below gives the solvent employed, the temperature and time of chlorination, the size of the batch of polyethylene chlorinated and the total quantity of chlorine used, while in Table IIb the character of the product in each example of this group is indicated.

TABLE IIA

Different solvents—with same concentration—methyl alcohol precipitation

| Ex. # | Solvent | Temp. (° C.) | Time (Hrs.) | Amount (gms.) | Chlorine used (gms.) |
|---|---|---|---|---|---|
| 5 | Carbon tetrachloride | 65 | 3 | 60 | 600 |
| 6 | Tri-chloroethane | 90 | 2 | 48 | 200 |
| 7 | Chloroform | 53 | 2 | 50 | 250 |

TABLE IIB

Different solvents—with same concentration—methyl alcohol precipitation

| Ex. # | Solvent | Character of Product | Chlorine Content (Per Cent) |
|---|---|---|---|
| 5 | Carbon tetrachloride | Flaky, white | 65.5 |
| 6 | Tri-chloroethane | Fibrous, white | 61.9 |
| 7 | Chloroform | Fibrous, off-white | 66.8 |

EXAMPLES 8–11

To illustrate various methods for separating the chlorinated product from the chlorination solvent, different portions of the solution of Example 7 above were treated in various ways in order to separate the chlorinated polyethylene from the chloroform. Example 7 itself represents one such portion which was precipitated by admixture with methyl alcohol and the data for Example 7 is included in the Table III below for purposes of comparison.

TABLE III

Different separation methods—with same concentration in $CHCl_3$

| Ex. # | Method of Separation | Character of Product | Chlorine Content (per cent) |
|---|---|---|---|
| 7 | Methyl Alcohol | Fibrous, pale cream | 66.8 |
| 8 | Mineral Spirits | do | 66.8 |
| 9 | Boiling Water | do | 66.8 |
| 10 | Spraying into Warm Air. | Powdery, pale cream | 66.8 |
| 11 | Spreading the Chlorinated Polyethylene-Chloroform Solution in a Sheet at Room Temperature. | Tough, transparent, flexible sheet. | 66.8 |

EXAMPLE 12

In this example a dispersion of 1% of polyethylene in carbon tetrachloride was chlorinated under the general conditions described above, including the presence of catalytic light. The polyethylene employed was of molecular weight of 18,000 to 20,000 and the dispersion contained a total of 50 grams. Chlorination was effected by bubbling 750 grams of chlorine through the dispersion over a period of twenty-five minutes. The chlorinated product was recovered by mixing the solution with methyl alcohol and the precipitate was found to contain 70.1% chlorine. It will be seen from this example that even quite a high content of chlorine may be attained in an extremely short time.

EXAMPLE 13

This example also illustrates the rapidity with which chlorination to a high content of chlorine may be effected. A dispersion was prepared in accordance with Example 12 above, the total amount of polyethylene present being 50 grams, and in effecting chlorination, 500 grams of chlorine were bubbled through the dispersion over a period of one-half hour. The product was again precipitated by employment of methyl alcohol, and the product contained 69.4% chlorine.

EXAMPLE 14

This example illustrates employment of still another chlorination solvent. A dispersion of 5% concentration of polyethylene in tetrachloroethane was prepared, containing 75 grams of polyethylene of molecular weight of 18,000 to 20,000. During chlorination the temperature of the dispersion was maintained at about 140° C. and a total of 1150 grams of chlorine was bubbled through the dispersion over a period of about five hours. The product was precipitated by the employment of methyl alcohol and contained 71.0% chlorine.

EXAMPLE 15

This example illustrates chlorination of polyethylene of relatively low molecular weight, i. e., about 4000. In this case, a dispersion of 10% concentration in carbon tetrachloride was prepared, the total quantity of polyethylene present being 100 grams. A total of 800 grams of chlorine were bubbled through the dispersion over a period of about four hours, the dispersion being maintained at a temperature of about 75° C. during chlorination. The product was precipitated by the employment of methyl alcohol and contained 70.0% chlorine.

EXAMPLE 16

This example illustrates chlorination at a temperature in the neighborhood of room temperature. Polyethylene of molecular weight of about 9800 was here employed, a dispersion of 2% concentration in carbon tetrachloride being prepared containing a total of 100 grams of the polymer. In preparing the dispersion the carbon tetrachloride was initially heated to about 70° C. to effect solution of the polymer and thereafter the dispersion was cooled to and maintained at about 30° C. during the course of chlorination. 1440 grams of chlorine were bubbled through the dispersion over a period of six and one-half hours and during this time, because of the exothermic reaction taking place, the dispersion was cooled in order to maintain the indicated temperature. The product was precipitated by the employment of methyl alcohol and had a chlorine content of 71.8%.

EXAMPLE 17

This example also illustrates chlorination at a temperature in the neighborhood of room temperature, although in this case the polyethylene employed was of molecular weight of 18,000 to 20,000. The conditions of chlorination in this example were exactly the same as noted above for Example 16, except for the points noted just below.

During the first six and one-half hours of chlorination 1340 grams of chlorine were bubbled through the dispersion and, at that time, only about one-half of the polyethylene had been chlorinated beyond the percentage content of chlorine corresponding to minimum solubility; which is in contrast to Example 16 in which the chlorination of the entire quantity of polyethylene present was completed in the first six and one-half hours. The other one-half of the polyethylene present was in a state of a substantially insoluble gel. In Example 17 the chlorination was continued to a total of eleven and one-half hours, at which time a total of 2340 grams of chlorine had been passed through the dispersion and during this continued chlorination the gel-like masses were broken up and gradually went into solution as the chlorine content thereof increased. A sample of the solution was taken at the six and one-half hour point and upon admixture with methyl alcohol yielded a precipitate having a chlorine content of 71.6%. The solution at the end of the eleven and one-half hour treatment was also admixed with methyl alcohol and yielded a product having a chlorine content of 72.3%.

From this example, particularly in comparison with others given herein, it appears that greater difficulty is encountered in chlorinating the higher molecular weight polyethylene, although, by persistent chlorination, it is possible to pass through and beyond the zone of minimum solubility. This example further illustrates that at the lower temperatures more prolonged chlorination is required in attaining a given content of chlorine.

EXAMPLE 18

This example illustrates the efficiency of the process of the invention with respect to total quantity of chlorine required in attaining a high content in the product. A dispersion in carbon tetrachloride of 1.5% concentration was prepared, the polyethylene here being of molecular weight of 18,000 to 20,000. The total quantity of polyethylene present was 84 grams and 475 grams of chlorine were bubbled through the dispersion over a period of two and one-quarter hours during which time the temperature of the dispersion was maintained at about 65° C. The product was recovered by pouring the solution into boiling water and was vigorously agitated in the boiling water for an appreciable length of time in order to assure volatilization of all of the carbon tetrachloride. A chlorine determination of the product showed a chlorine content of 74.4%.

In considering the result of this example and particularly the indicated chlorine content of the product, it must be kept in mind that minor experimental error is to be expected in any analysis for chlorine content, especially with highly chlorinated materials. Moreover, the well known Parr bomb method for chlorine determination (which method was used in all determinations given herein) when employed in the manner customarily adopted for anlysis of organic compounds containing chlorine in percentages normally encountered, substantially uniformly shows an error of about 1-3% on the high side when that method is applied to organic materials of very high chlorine content, such as those herein discussed.

I have found that this minor error consistently appears in the analysis for chlorine content in polyethylene having in the neighborhood of 73% combined chlorine. This is evidenced by the example here being considered, in which theoretical calculation shows that even if the chlorine (475 grams) was quantitatively used (i. e., 100% efficiency in reaction), the maximum possible chlorine content of the product would be 73.7%, which compares with a content of 74.4% as determined by the Parr bomb analysis. Naturally, 100% efficiency is not to be expected, so that this product must necessarily contain slightly less than 73.7% chlorine.

The comments just above should be kept in mind particularly when considering the examples which are given just below to illustrate the preferred product which, as is fully established above, contains in the neighborhood of 73% chlorine.

EXAMPLES 19–28

All examples of this group were prepared by preliminarily forming a dispersion of the polyethylene in carbon tetrachloride and bubbling chlorine gas through the disperson while the disperson was maintained at an elevated temperature of the order of from 60° C. to 75° C. In all cases catalytic light was employed and at least some excess of chlorine was used. The table here below gives a few of the important factors with respect to these examples. The table, moreover, includes the corresponding data for Examples 1, 2 and 3 described more fully above.

The comments shortly above with respect to chlorine determinations should be kept in mind in connection with the column of chlorine contents indicated in the table.

TABLE IV

| Example # | Conc. of Polyethylene in CCl₄ (Per Cent) | Molecular Wt. of Polyethylene | Method of Precipitation | Chlorine Content (Per Cent) |
|---|---|---|---|---|
| 1 | 1.0 | 18,000–20,000 | Alcohol | 75.8 |
| 2 | 1.5 | 18,000–20,000 | Alcohol | 76.2 |
| 3 | 2.5 | 18,000–20,000 | Alcohol | 74.9 |
| 19 | 1.5 | 18,000–20,000 | Boiling H₂O | 74.4 |
| 20 | 2.0 | 18,000–20,000 | Alcohol | 72.4 |
| 21 | 1.0 | 18,000–20,000 | Alcohol | 75.8 |
| 22 | 1.0 | 18,000–20,000 | Alcohol | 74.5 |
| 23 | 1.0 | 18,000–20,000 | Alcohol | 72.5 |
| 24 | 2.0 | 18,000–20,000 | Alcohol | 72.2 |
| 25 | 2.0 | 18,000–20,000 | Alcohol | 73.2 |
| 26 | 2.5 | 15,000 | Alcohol | 74.2 |
| 27 | 5.0 | 9,800 | Alcohol | 75.9 |
| 28 | 5.0 | 7,000 | Alcohol | 73.0 |

All percentage figures given in this application represent percentages by weight.

I claim:

1. A process for making a highly chlorinated polyethylene product which process comprises preparing a dispersion of less than 3% of polyethylene of molecular weight of from 18,000 to 40,000 in a dispersion medium in which the highly chlorinated polyethylene is soluble, passing chlorine gas through the dispersion in the presence of catalytic light, the passage of chlorine gas being continued until the content of chlorine in the polyethylene being chlorinated rises to about 73%, the temperature of the dispersion during the chlorination being maintained close to the boiling temperature of the dispersion medium at least during the latter portion of the chlorination, and precipitating the highly chlorinated product from the solution thereof in the dispersion medium.

2. A product produced according to the method of claim 1 and characterized by a softening point above 200° C. and by a decomposition point above 230° C.

VIGEN K. BABAYAN.

REFERENCES CITED

The following references are of record in the file of this patent:

UNITED STATES PATENTS

| Number | Name | Date |
|---|---|---|
| 2,364,410 | Whittaker | Dec. 5, 1944 |
| 2,398,803 | Myles | Apr. 23, 1946 |